(12) United States Patent
Brandyburg et al.

(10) Patent No.: US 7,804,787 B2
(45) Date of Patent: Sep. 28, 2010

(54) METHODS AND APPARATUS FOR ANALYZING AND MANAGEMENT OF APPLICATION TRAFFIC ON NETWORKS

(75) Inventors: Gordon Brandyburg, Silver Spring, MD (US); Naresh Kumar Kannan, Rexford, NY (US); Jeff Kobryn, Baltimore, MD (US); Kent Laver, Kanata (CA); James Thomas Menzies, Montgomery Village, MD (US); Thomas R. Nisbet, Ellicott City, MD (US); Matthew A. Tucker, Gaithersburg, MD (US)

(73) Assignee: Fluke Corporation, Everett, WA (US)

( * ) Notice: Subject to any disclaimer, the term of this patent is extended or adjusted under 35 U.S.C. 154(b) by 554 days.

(21) Appl. No.: 11/477,868

(22) Filed: Jun. 30, 2006

(65) Prior Publication Data

US 2007/0011317 A1    Jan. 11, 2007

Related U.S. Application Data

(60) Provisional application No. 60/697,362, filed on Jul. 8, 2005.

(51) Int. Cl.
   H04L 12/26    (2006.01)
   H04L 12/28    (2006.01)
(52) U.S. Cl. .................... 370/252; 370/389; 709/224
(58) Field of Classification Search .................. None
   See application file for complete search history.

(56) References Cited

U.S. PATENT DOCUMENTS

| | | |
|---|---|---|
| 5,101,402 A | 3/1992 | Chiu et al. |
| 5,231,593 A | 7/1993 | Notess |
| 5,243,543 A | 9/1993 | Notess |
| 5,251,152 A | 10/1993 | Notess |
| 5,315,580 A | 5/1994 | Phaal |
| 5,768,552 A | 6/1998 | Jacoby |
| 5,781,729 A | 7/1998 | Baker et al. |
| 5,802,320 A | 9/1998 | Baehr et al. |

(Continued)

OTHER PUBLICATIONS

Lee, Henry C.J., Thing, Vrizlynn L.L., "Port Hopping for Resilient Networks", Vehicular Technology Conference, 2004. VTC2004-Fall. 2004 IEEE 60th, vol. 5, pp. 3291-3295, Sep. 2004, entire document.*

(Continued)

Primary Examiner—Gregory B Sefcheck
Assistant Examiner—Suk Jin Kang
(74) Attorney, Agent, or Firm—Edell, Shapiro & Finnan, LLC

(57) ABSTRACT

An apparatus and method are provided for analyzing traffic on a network by monitoring packets sent between devices on the network and identifying applications occurring between devices on the network based on information derived from monitoring the packets. Techniques are provided to examine header information of the packets, such as information in the header of Internet Protocol (IP) packets, to identify applications that are occurring on the network. In some cases, information about the packet beyond the header information is examined to match a packet to a particular application. Using these techniques, a list is built of all of the applications occurring between devices on the network. Parameters may be generated to track one or more of the response time, latency and traffic volume associated with a particular device on the network.

40 Claims, 12 Drawing Sheets

U.S. PATENT DOCUMENTS

| | | | |
|---|---|---|---|
| 6,115,393 | A | 9/2000 | Engel et al. |
| 6,141,686 | A | 10/2000 | Jackowski et al. |
| 6,262,976 | B1 | 7/2001 | McNamara |
| 6,381,632 | B1 | 4/2002 | Lowell |
| 6,392,996 | B1 | 5/2002 | Hjalmtysson |
| 6,412,000 | B1 | 6/2002 | Riddle et al. |
| 6,453,345 | B2 | 9/2002 | Trcka et al. |
| 6,457,051 | B1 | 9/2002 | Riddle et al. |
| 6,473,400 | B1 | 10/2002 | Manning |
| 6,591,299 | B2 | 7/2003 | Riddle et al. |
| 6,662,227 | B2 | 12/2003 | Boyd et al. |
| 6,807,156 | B1 | 10/2004 | Veres et al. |
| 6,934,745 | B2 | 8/2005 | Krautkremer |
| 6,954,789 | B2 * | 10/2005 | Dietz et al. ................. 709/224 |
| 7,216,161 | B1 * | 5/2007 | Peckham et al. ............ 709/224 |
| 7,420,929 | B1 * | 9/2008 | Mackie ....................... 370/252 |
| 2002/0013841 | A1 | 1/2002 | Schweitzer |
| 2002/0013842 | A1 | 1/2002 | Schweitzer |
| 2002/0013843 | A1 | 1/2002 | Schweitzer |
| 2002/0016843 | A1 * | 2/2002 | Schweitzer et al. ......... 709/227 |
| 2002/0038364 | A1 | 3/2002 | Schweitzer |
| 2002/0118649 | A1 | 8/2002 | Farley |
| 2002/0144156 | A1 | 10/2002 | Copeland |
| 2003/0005112 | A1 | 1/2003 | Krautkremer |
| 2003/0145077 | A1 | 7/2003 | Khan et al. |
| 2003/0165114 | A1 | 9/2003 | Kusama et al. |
| 2003/0229692 | A1 | 12/2003 | Vo |
| 2004/0022191 | A1 * | 2/2004 | Bernet et al. ................. 370/230 |
| 2004/0049576 | A1 * | 3/2004 | Schweitzer et al. ......... 709/224 |
| 2004/0088407 | A1 | 5/2004 | Boyd et al. |
| 2004/0111507 | A1 | 6/2004 | Villado et al. |
| 2004/0117481 | A1 | 6/2004 | Arimoto et al. |
| 2004/0143658 | A1 | 7/2004 | Newton et al. |
| 2005/0108573 | A1 | 5/2005 | Bennett et al. |
| 2005/0220017 | A1 * | 10/2005 | Brand et al. ............. 370/230.1 |
| 2005/0249125 | A1 * | 11/2005 | Yoon et al. ................... 370/252 |
| 2007/0070996 | A1 * | 3/2007 | Oran .......................... 370/389 |
| 2007/0073838 | A1 * | 3/2007 | Shizuno ...................... 709/217 |
| 2007/0171827 | A1 * | 7/2007 | Scott et al. .................. 370/235 |

OTHER PUBLICATIONS

European Search Report dated Nov. 7, 2006 in counterpart European Patent Application No. 06014185.0.

* cited by examiner

METHODS AND APPARATUS FOR ANALYZING AND MANAGEMENT OF APPLICATION TRAFFIC ON NETWORKS

CROSS REFERENCE TO RELATED APPLICATION

This application claims priority from U.S. Provisional Patent Application No. 60/697,362 entitled "Analysis and Management of Application Traffic on Networks," filed Jul. 8, 2005, the entirety of which is incorporated herein by reference.

BACKGROUND OF THE INVENTION

1. Field of the Invention

The present invention relates to methods and apparatus for management of data networks.

2. Description of the Related Art

Packetized data networks are in widespread use transporting mission critical data throughout the world. A typical data transmission system includes a plurality of customer (user) sites and a data packet switching network, which resides between the sites to facilitate communication among the sites via paths through the network.

Packetized data networks typically format data into packets for transmission from one site to another. In particular, the data is partitioned into separate packets at a transmission site, wherein the packets usually include headers containing information relating to packet data and routing. The packets are transmitted to a destination site in accordance with any of several conventional data transmission protocols known in the art, one example of which is the Internet Protocol (IP).

Networks that communicate using the IP are an effective and flexible mechanism for enabling a wide variety of applications. However different applications frequently exhibit very different performance and capacity capabilities and place different loads on the underlying IP network. In addition, users place performance requirements (e.g., throughput and responsiveness) on these applications that challenge the queuing and routing techniques employed by IP networks to manage the flow of application traffic.

Current network management tools cannot provide effective techniques for the monitoring and analysis of application traffic across IP networks. Existing techniques focus on individual IP packets or IP flows. Both of these techniques are too low-level to provide network management staff with an effective understanding of how individual applications are operating on their IP networks, and how those applications and the IP networks need to be configured and optimized to achieve better application performance. This is because the traffic for a single application can contain numerous distinct IP flows and even larger numbers of IP packets.

What is needed is a technique for monitoring and analyzing packet traffic on IP networks to provide a better view into the performance of the network at an application level.

SUMMARY OF THE INVENTION

In accordance with the present invention, an apparatus and method are provided for analyzing traffic on a network by monitoring packets sent between devices on the network and identifying applications occurring between devices on the network based on information derived from monitoring the packets. Techniques are provided to examine header information of the packets, such as information in the header of Internet Protocol (IP) packets, to identify applications that are occurring on the network. In some cases, information about the packet beyond the header information is examined to match a packet to a particular application. Using these techniques, a list is built of all of the applications occurring between devices on the network. Parameters may be generated to track one or more of the response time, latency and traffic volume associated with a particular device on the network. By generating information about the performance of the network in terms of direct and objective data concerning the applications occurring on the network, maintenance, troubleshooting and network planning are greatly simplified and improved as compared with other network monitoring tools heretofore known.

The above and still further objects, features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

Figure 1:
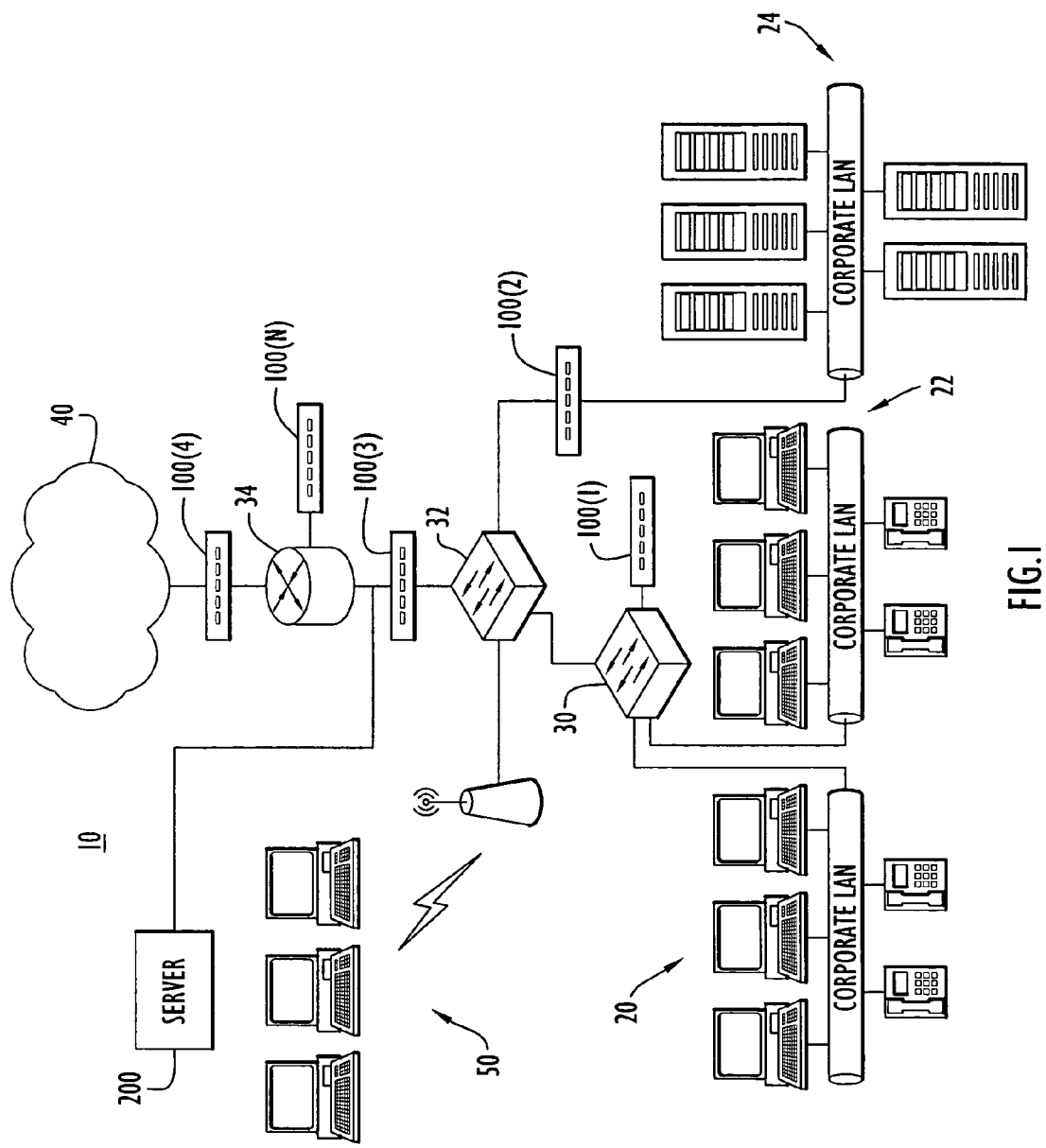
FIG. 1 is a block diagram of a network environment in which the techniques of the present invention may be employed.

The following detailed explanations of FIGS. 1-12 reveal the methods and apparatus of the present invention. A system for deriving application-level information for purposes of monitoring performance of a network is illustrated in FIG. 1, and is generally shown at reference numeral 10. In accordance with the present invention, there are a plurality of network monitoring devices (NMDs) 100(1)-100(N) disposed through an application network environment that may include multiple local area networks (LANs). In the example network environment shown in FIG. 1, there are a plurality of corporate LANs 20, 22, 24 and routers 30 and 32 that interconnect the LANs ultimately to a wide area network (WAN) shown by the cloud at reference numeral 40. There is a customer edge router (CER) 34 that connects the various LANs to the WAN 40. There is also a wireless LAN 50 that is connected to router 32.

The NMDs 100(1) to 100(N) are connected at a variety of points in the network environment 10. For example, NMD 100(1) is connected to router 30, NMD 100(2) is connected in-line between LAN 24 and router 32, NMD 100(3) is connected in-line between router 32 and CER 34, NMD 100(4) is connected in-line between the CER 34 and the WAN 40, and so on. Each NMD 100(1) to 100(N) is capable of monitoring and analyzing packets, such as Internet Protocol (IP) packets traveling in the network environment 10. For example, the NMDs 100(1)-100(N) are network monitoring devices sold by Visual Networks, Inc., as part of its Visual UpTime® Select™ network monitoring and management system.

In general, the NMD is a monitoring device and can be any type of network monitoring device or probe and can comprise standalone hardware/software devices or software and/or hardware added to network equipment such as PCs, routers, data service unit/channel service unit (DSU/CSU), FRADS, voice switches, phones, etc. By way of non-limiting example, a monitoring device can be a CSU/DSU that operates both as standard CSU/DSU and as managed devices capable of monitoring and inserting network management traffic; an inline device residing between a DSU and router, which monitors network traffic and inserts network management traffic; or a passive monitoring device that monitors network traffic only. The monitoring device can be "active" monitoring devices capable of inserting protocol data units (PDUs) into the data traffic (e.g., test PDUs) or "passive" monitoring devices that observe PDU data traffic without generating or inserting any test packets into the data traffic for the purpose of measuring performance metrics. Optionally, passive monitoring devices can forward measurement data to each other via an out of band channel or through a link other than the monitored network channel, thereby permitting passive monitoring devices to directly coordinate testing periods.

As used herein, the term "packet" does not imply any particular transmission protocol and can refer to units or segments of data in a system using, for example, any one or combination of the above-listed data transmission protocols (or other protocols). "IP" is only an example of a type of protocol. However, since the term "packet" is often associated with only certain data transmission protocols, to avoid any suggestion that the system of the present invention is limited to any particular data transmission protocols, the term "protocol data unit" (PDU) is used herein to refer generically to the unit of data being transported by the communication network, including any discrete packaging of information. Thus, for example, a PDU can be carried on a frame in the frame relay protocol, a related set of cells in the ATM protocol, a packet in the IP protocol, etc.

The NMDs 100(1) to 100(N) capture the packets and extract certain information from the packets, such as header information or more in depth information from the packet. This extracted information is then coupled to a server 200 that communicates with the NMDs either via a dedicated or network connection. The server 200 performs analysis on the extracted information using the techniques described hereinafter, under control of one or more software programs stored on the server. Alternatively, the analysis may be performed on a computing device more locally associated with any one or more of the NMDs 100(1) to 100(N), or on a NMD itself.

Figure 2:
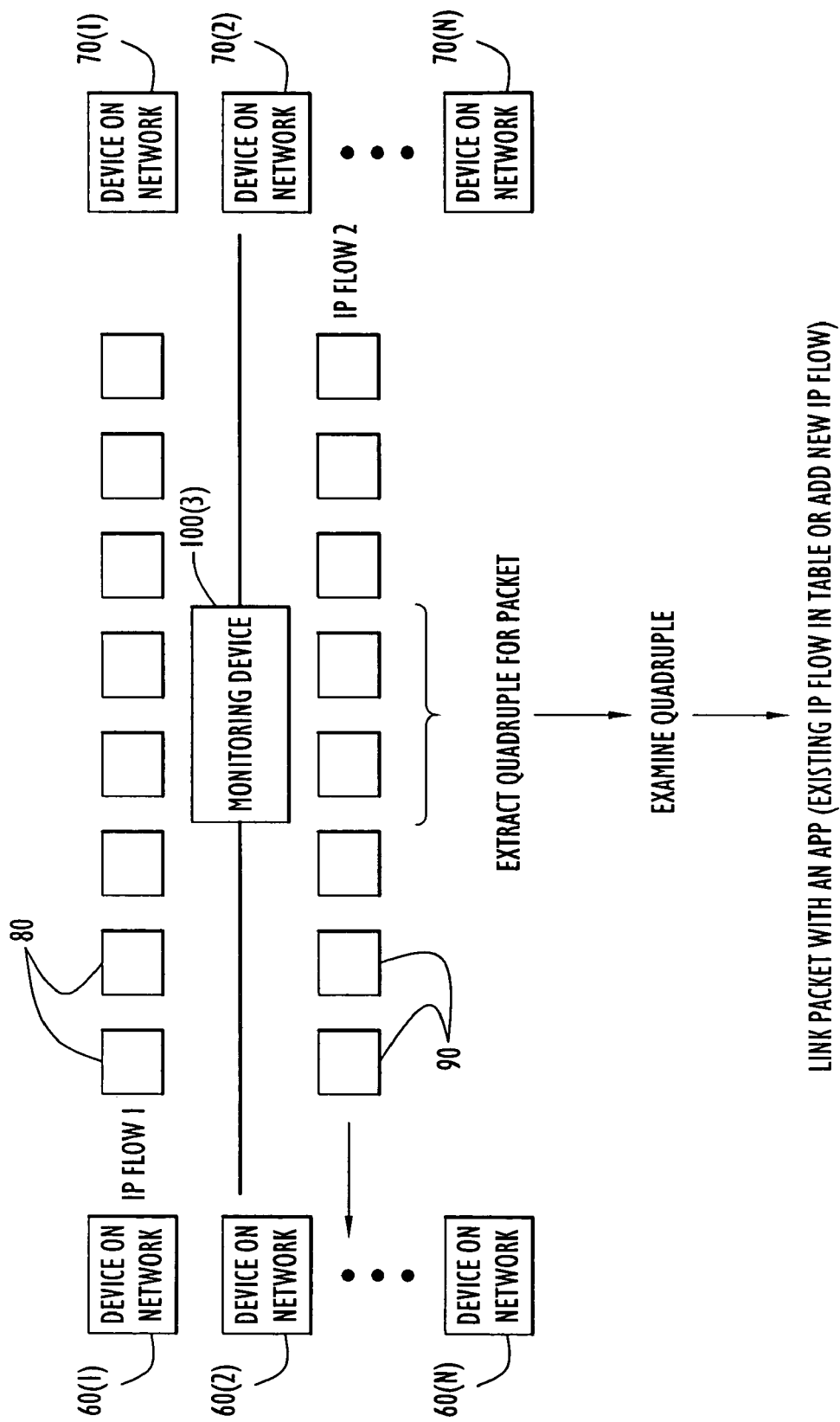
FIG. 2 is a flow diagram generally depicting the network monitoring and analysis technique according to an embodiment of the present invention.

Turning to FIG. 2, the basic analysis framework for the method and apparatus of the present invention will be described. A network monitoring device, such as monitoring device 100(3) as an example, monitors packets moving in both directions between devices on the network. In the example shown in this figure, there are two so-called "IP flows" of packets, IP Flow 1 and IP Flow 2, where IP Flow 1 is associated with packets sent between one of a plurality of devices 60(1) to 60(N) on one side of the monitoring 100(3) to one of a plurality of devices 70(1) to 70(N) on the other side of the monitoring device 100(3). Conversely, the IP Flow 2 is associated with packets sent between one of the plurality of devices 70(1)-70(N) to one of the plurality of devices 60(1)-60(N). The devices on the network may be PCs, servers, wireless devices, printers, etc. Thus, an IP Flow summarizes information relating to an exchange of packets between specific source and destination IP addresses using a specific pair of ports. An IP Flow is defined by the packer header information quadruple of Source IP address, Source port, Destination IP Address and Destination port, or any one or more of these header elements. Thus, unless the application is undergoing "port hopping", the packets 80 associated with IP Flow 1 have the same quadruple (but possible different information content) and the packets 90 associated with IP Flow 2 have the same quadruple. From the perspective of managing application performance on a network, the application traffic between two IP addresses can use many pairs of source and destination ports.

The term "Application Flow" is introduced to define a higher level and more intuitively meaningful representation of network activity than an IP Flow. An Application Flow is a collection of traffic that is exchanged between two hosts (devices on the network) for a single application. Typically, a single Application Flow contains many (potentially very many) IP Flows and any single IP Flow always belongs to a single Application Flow. Measuring activity on a network in terms of Application Flows is a more natural and useful mechanism for analyzing and managing application traffic.

An Application Flow organizes observed IP traffic by application. Applications are the source of all IP traffic and also the primary attribute of IP traffic that users and management staff can understand. Applications are the natural instrument for managing IP traffic. Application Flow is an abstraction layer about IP Flow to provide information about network activity and performance at a level that is meaningful to a person.

For example, one does not consider a single IP Flow within an email application (i.e., the task of opening an individual message) but rather the entire collection of IP Flows used to open, read, send and file emails. This entire collection of IP Flows is an Application Flow and it is a natural organizing principle. This holds true as well for applications running over the web to a custom universal resource locator (URL) (e.g. online shopping). The many IP Flows that comprise the loading of pages, validation and acceptance of data entry fields, etc. are collectively the meaningful Application Flow. Applications such as CRM, ERP, database, file transfers, etc. all follow the same principle. Destructive or harmful applications such as "malware", "Trojans", viruses, "addware", "spyware", etc. are also not manageable by IP Flow but the Application Flow concept provides a much stronger basis for their identification and ultimately elimination. While a collection of many IP Flows from an infected computer trying to infect targeted hosts might be difficult to recognize, the Application Flow summary would be intuitively recognizable. Further, non-destructive recreational applications in a congested business environment might be of great concern yet would be difficult to detect without detecting Application Flows.

Application Flows allows the categorization of applications into major classes including: legitimate business applications, non-business legitimate ("rogue") and potentially harmful applications and uninteresting applications. This categorization provides an effective means of enabling identification, analyzing network performance and responding in an appropriate manner. Within applications, it is possible to recognize the role of IP hosts as Client and Servers. This categorization provides an effective means of automatically detecting many of the important networking resources and providing in-depth monitoring of server performance. The scalability and manageability of the management system are substantially improved by the consolidation of information from IP Flows to Application Flows.

According to the present invention, it is desirable to process packets moving in both directions in a bi-directional stream of IP packets to accurately and efficiently associate each IP packet with an Application Flow. In order to provide an effective, accurate and easy-to-use interface for the analysis and management of IP traffic, IP packets are organized into IP Flows and each IP Flow is assigned to an Application Flow, i.e., an instance of an application. As indicated above, an IP Flow is an exchange of packets between a source IP address and port and a destination IP address and port. IP packets are organized into IP Flows by examining the source and destination IP addresses in the IP header together with the source and destination port numbers in the TCP or UDP header of the packet. IP Flows are assigned to Application Flows based on a combination of techniques. These include:

Detection of well-known ports. There is a de-facto standard list of port numbers that are reserved for use by certain applications. When a well-known port is detected in an IP Flow, that IP Flow is assigned to that Application Flow.

Tracking of dynamic port hopping. Applications can dynamically shift the address ports they use as they work in connection with an application. This is called "port hopping", and it results in the creation of a new IP Flow. When port hopping is detected, the new IP Flow is assigned to the same application as the original IP Flow such that that it is tracked as one Application Flow with a unique identifier. Any further port hopping that may occur for that Application Flow thereafter is ignored.

Deep packet inspection. Many applications can be recognized by specific values or data structures that they use in their IP packets. Inspection of the content of IP packets to detect these specific values or data structures can be used to assign an IP Flow to an application. For example, for an IP packet determined to be associated with an HTTP application, an inspection is made inside the packet (beyond the IP header) at the universal resource identifier (URI) and a pattern match algorithm may be executed on a certain subset (e.g., first predetermined number) or all of the bits of the URI to determine what kind of application the packet is associated with. Definitions for this type of so-called "deep packet analysis" can be added to the software after its initial installation as further analysis is made on new custom applications deployed across the network to enhance the resolution of visibility into these applications.

Figure 3:
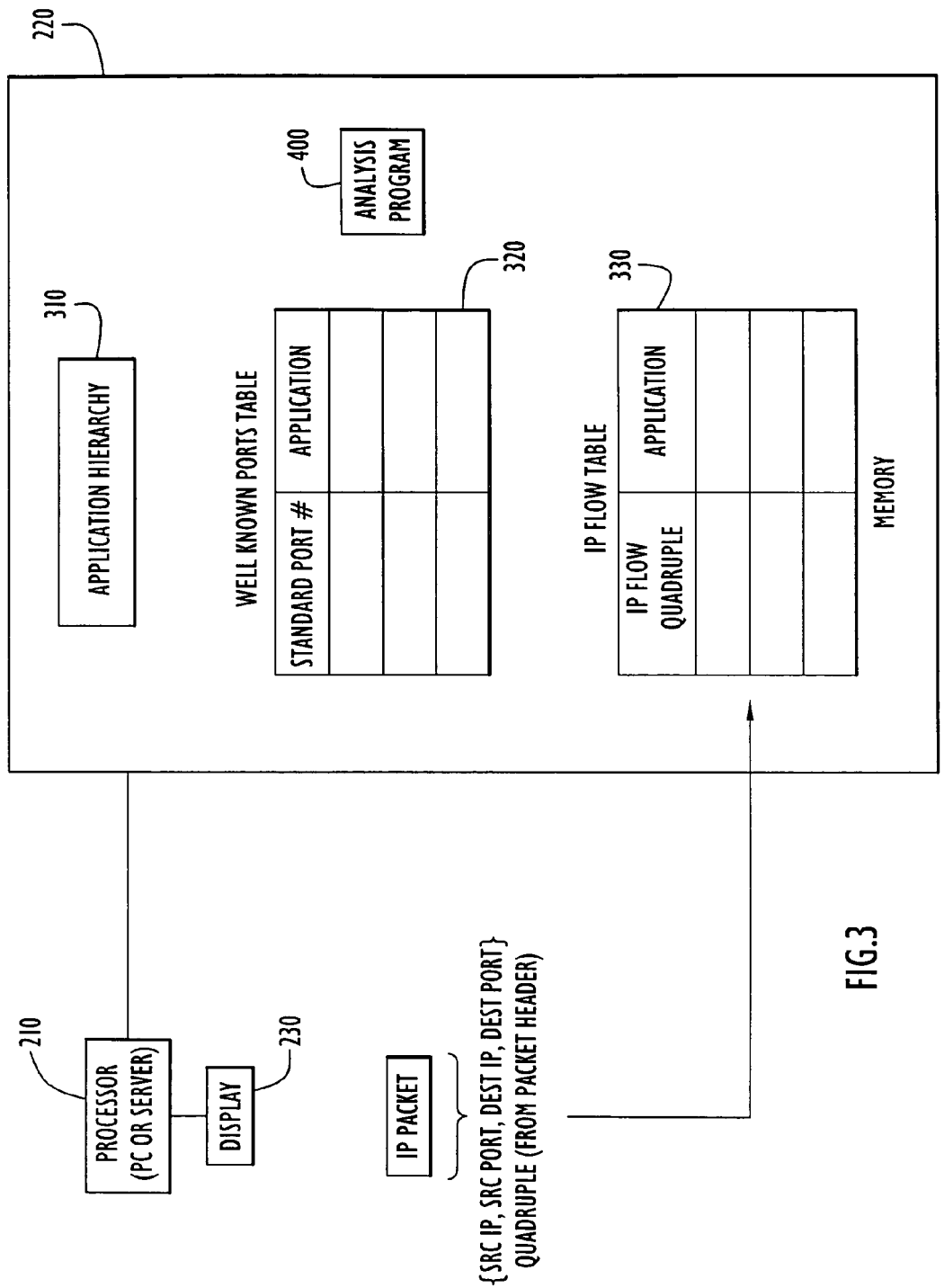
FIG. 3 is a block diagram depicting the process environment for the network and analysis technique according an embodiment of the present invention.

With reference to FIG. 3, the approach uses three primary data structures. A processor 210 (of a server 200 or a PC) has a memory 220 associated therewith that stores these data structures as well as an analysis program 400 that performs the analysis techniques described hereinafter. A display 230 may also be provided that displays data produced by the processor in the course of execution of the analysis program. The three data structures are the Application Hierarchy 310, Well Known Ports Table 320 and IP Flow Table 330. The Application Hierarchy 310 is used to manage the definitions of each application and the hierarchical relationships between applications. The Well Known Port Table 310 is a list of all well-known TCP or UDP ports and the application that uses each port. The IP Flow Table 320 is a list that tracks the application to which each detected IP Flow belongs. Thus, the IP Flow Table is a list of the Application Flows (instances of applications) determined to be occurring on the network at any given time. The same application may be occurring between different pairs of devices on the network. Thus, it is necessary to detect and track each of these application instances and this is done by tracking Application Flows.

Application Hierarchy

Figure 4:
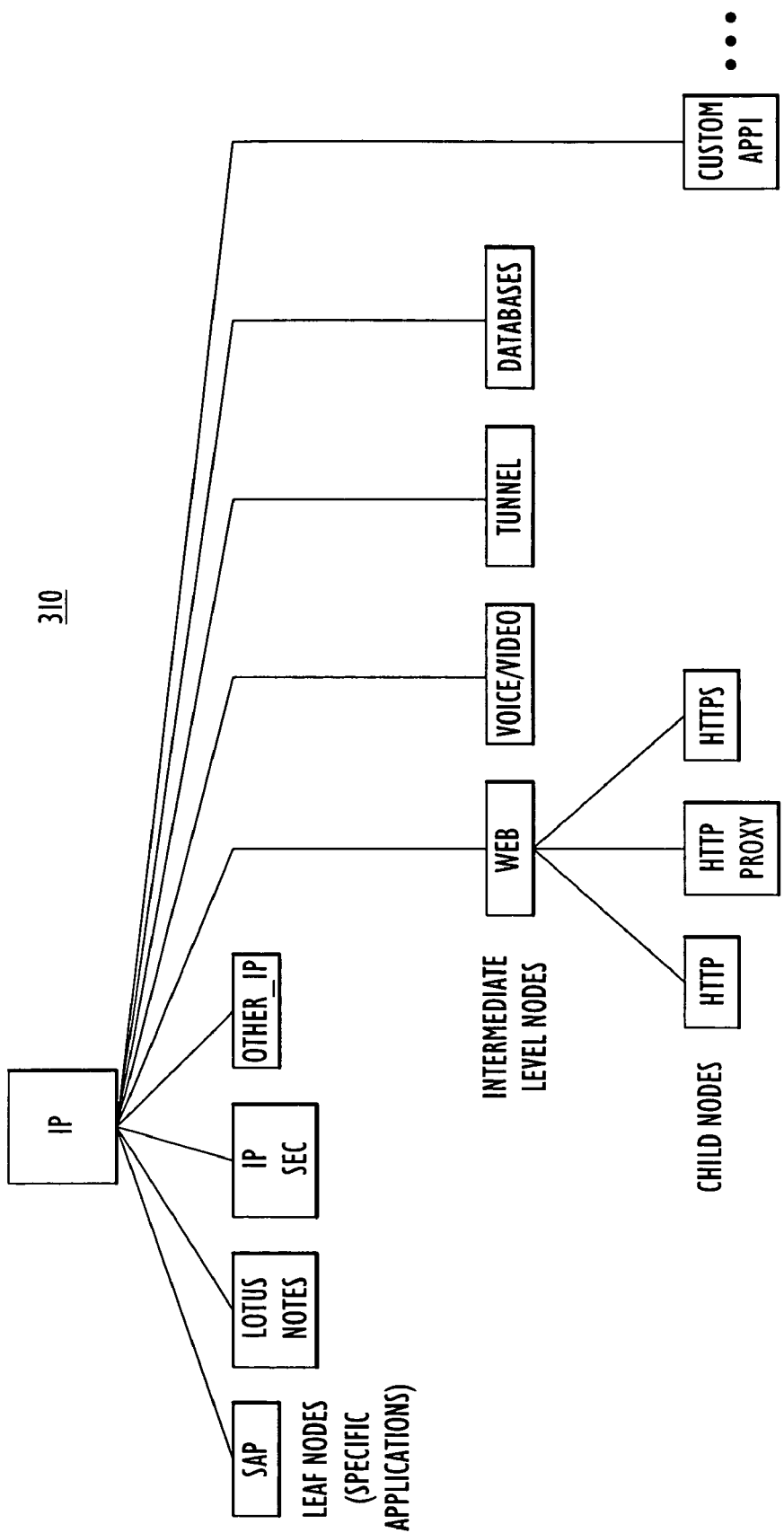
FIG. 4 is a diagram depicting an example of an application hierarchy used in the network monitoring and analysis technique according an embodiment of the present invention.

Referring to FIG. 4, the Application Hierarchy 310 is a hierarchy of recognized IP applications. Each node in the hierarchy represents an application or a closely related group of applications. For example "IP" is the top level node in the hierarchy and represents all IP applications. All other IP applications are descendents of the "IP" application. In addition there is an IP application named "Other_IP". The Other_IP application is a direct child of the IP application. Any IP Flow that cannot be determined to belong to a recognized application is assigned to the Other_IP application.

The Application Hierarchy 310 is pre-populated with the definitions for many applications and can also be dynamically extended or updated in the field to include additional applications. The top node in the hierarchy is "IP" and it represents all IP traffic. Leaf nodes in the hierarchy represent specific applications. For example, as shown in FIG. 4, Lotus Notes, SAP and IP Sec are leaf nodes. Intermediate level nodes in the hierarchy represent groups of related applications. All intermediate nodes have at least one child node (which may itself be an intermediate node). Web, Voice/Video and Tunnel are all examples of intermediate nodes. Moreover, a Web application, for example, has at least three child applications: HTTP; HTTP Proxy and HTTPS, as an example. That is, some applications may spawn other, lower level applications, depending on the action of function of the application. It would be advantageous to provide visibility into these sub or child applications of an application in order to ascertain the impact a certain sub-application may have on network throughput, etc.

For every intermediate node in the Application Hierarchy 310 there is an associated technique to identify the child applications. For example, there is a technique for inspecting a Web application packet and determining whether it belongs to HTTP, HTTP Proxy or HTTPS. Similarly there are techniques for examining packets to determine whether it belongs to Voice/Video, Tunnel, Databases, Citrix, etc. The technique does not have to always succeed in identifying a child application.

The hierarchy can be dynamically extended with "custom" applications. Some applications running on a network are designed "in-house" exclusively by or for that business entity or user. These applications are referred to as "custom" applications because they are not off-the-shelf applications that operate in generally the same manner across a network regardless of the particular user network. According to the present invention, knowledge about those custom applications is obtained in order to set definitions that can be used to monitor packets and determine when that custom application is occurring. This is particularly important because many enterprise-strategic applications are custom or in-house applications.

The creation, deletion and definition of custom applications are controlled by users. A set of rules are provided that specify how to inspect the content of an IP packet and determine if it belongs to a custom application. A variety of deep packet inspection techniques are possible for detecting custom applications. Examples of deep packet inspection techniques include examining URL's, database identifiers, Citrix application identifiers, fixed tags and field data, etc.

Well-Known Port Table

Referring back to FIG. 3, the Well Known Port Table 320 lists applications that use standard port numbers (both TCP and UDP ports). The table 320 lists each standard port number together with the application that uses that port.

IP Flow Table

The IP Flow Table 330 is used to map from IP Flows to applications. Every IP Flow is represented by the quadruple of (source IP address, source port, destination IP address, destination port) and belongs to a single specific application. The IP Flow Table lists all detected IP Flows together with the application that each IP Flow belongs to. Using the IP Flow Table 330, it is necessary to determine the application only for the first IP packet in each IP Flow. For all subsequent IP packets in that IP Flow, the application can be efficiently identified by looking up the IP Flow in the IP Flow table 330. This can avoid significant further packet analysis.

Algorithm—Assigning IP Packets to Applications

Figure 5A:
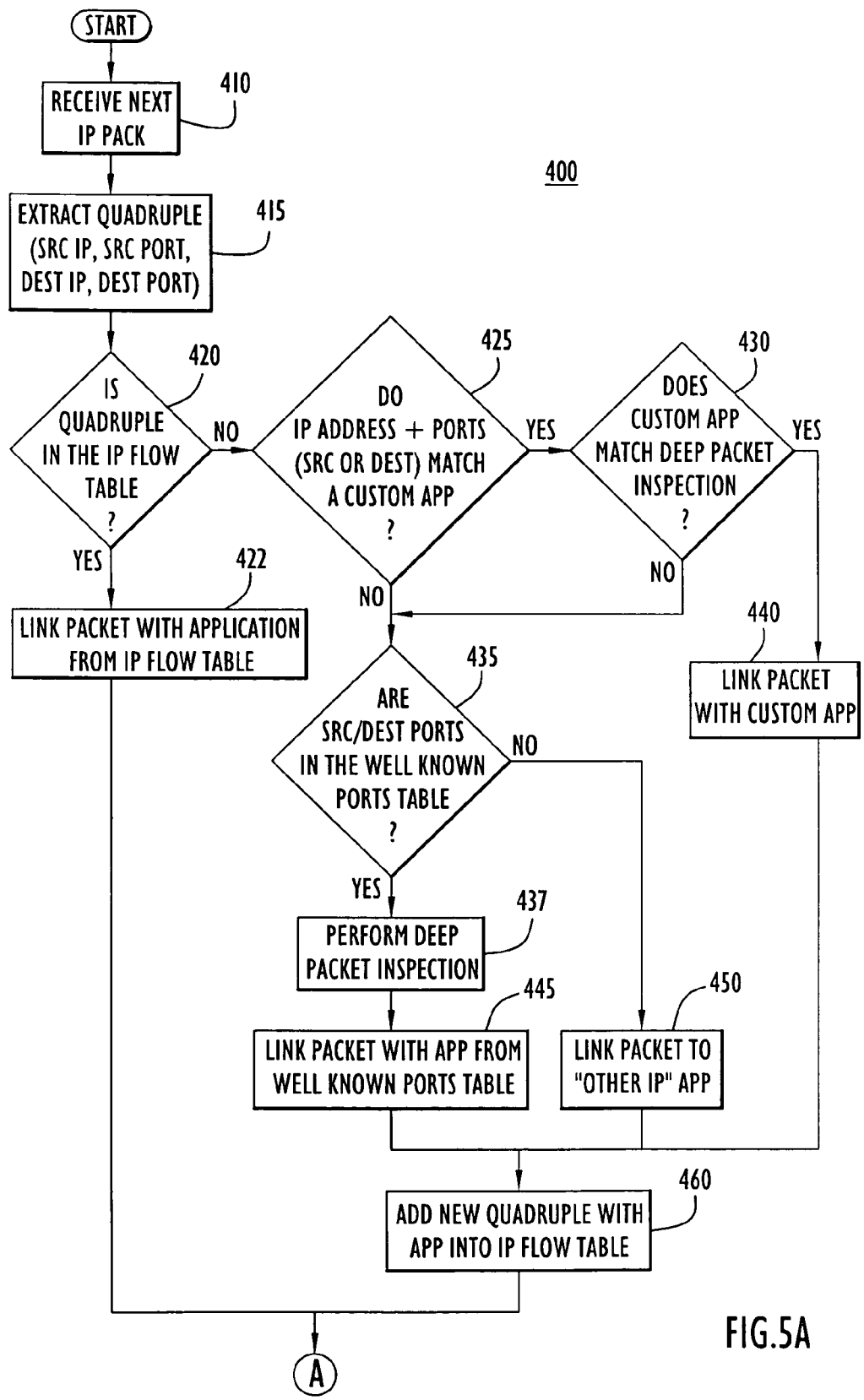
FIGS. 5A and 5B show a flow chart of an application detection technique according to the present invention.
Figure 5B:
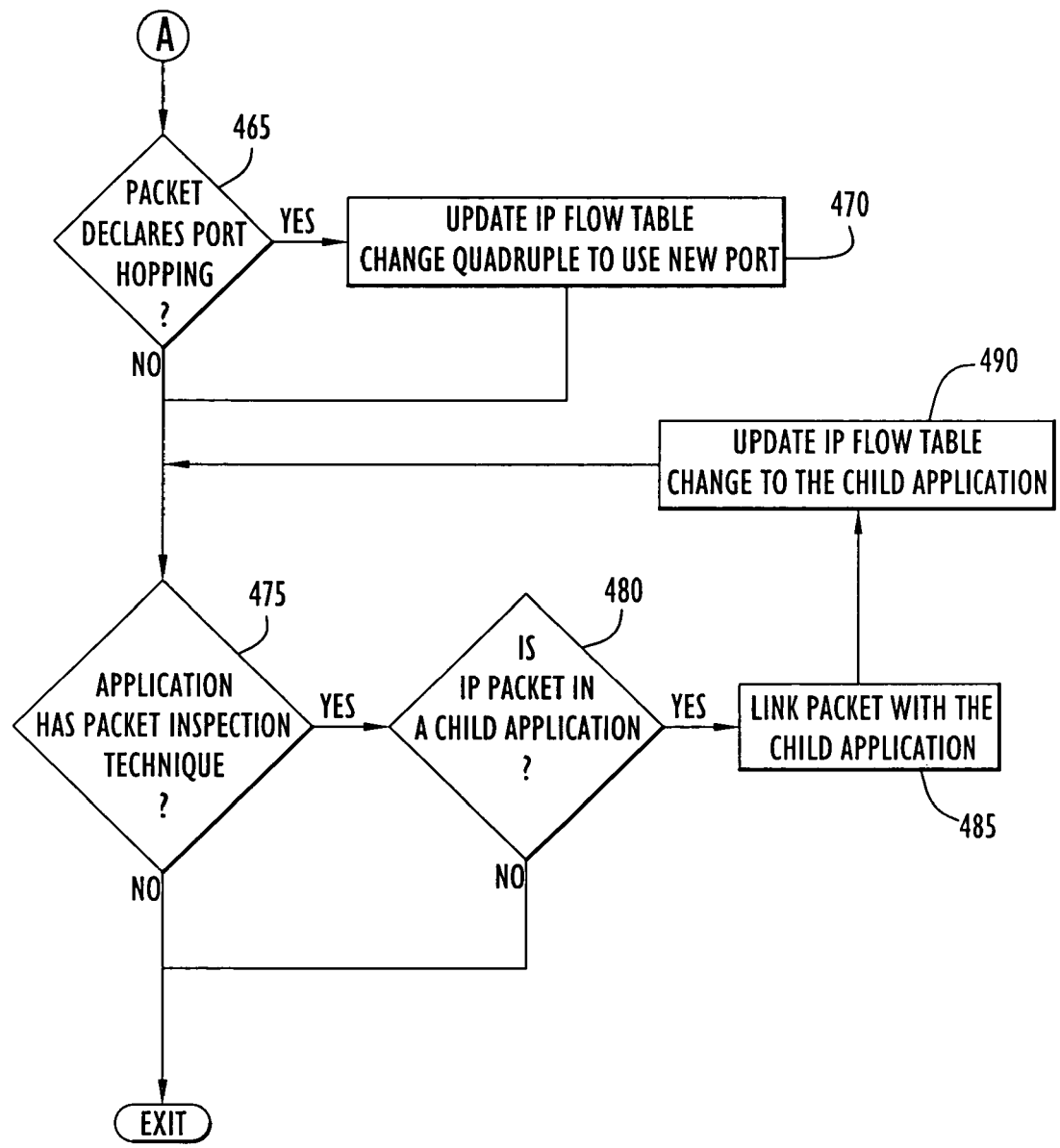

Referring now to FIGS. 5A and 5B, the application detection algorithm 400 is described in greater detail. The algorithm begins at 410 by receiving the next packet to be examined. This step occurs in one of the NMDs shown in FIG. 1. Next, at 415, for each packet, the NMD extracts the quadruple. As indicated above, the quadruple is packet header information that includes: the source IP address, source port, destination IP address and destination port. It should be understood that one or more, but not necessarily all, of these quadruple elements may need to be examined. At 420, it is determined whether that quadruple is already in the IP Flow Table. If the quadruple is present in the IP Flow Table then, this IP packet belongs to the listed application associated with that IP Flow at 422. The process then jumps as described hereinafter.

Next, if the quadruple is not already in the IP Flow Table, then at 425, first the destination IP address and port number, and then the source IP address and port number (either TCP or UDP) are examined and compared with stored data representing definitions of the custom applications in the Application Hierarchy. If these match the IP address range and the port range of any custom application then at 430 it is determined whether the corresponding custom application has additional elements in its definition (e.g. a URL, database identifier, Citrix application identifier, etc.). If so, then at 430, the relevant elements of the packet are further inspected. If the further elements of the packet do not match the deep packet inspection definition for the custom application, then the process goes to 435. Otherwise, at 440, since this IP Packet has been determined to belong to a custom application, the quadruple for this packet is linked into the IP Flow Table to the custom application.

At 435, first the destination port number and then the source port number (either TCP or UDP) of the packet are examined to determine if those numbers are in the Well Known Port Table. If one or either (destination or source) port number is present in the Well Known Port Table then at 445 this IP Packet belongs to the application and the packet's quadruple is added to the IP Flow Table at 460 and linked to the application listed in the Well Known Port Table. It should be understood that while the deep packet inspection techniques have been described with respect to so-called custom applications, they may also use to detect and recognize common or standard ("off the shelf") applications to complement the recognition of well known ports. Thus, optionally, for some of the well-known ports, the algorithm may employ deep packet inspection to look for predetermined tags at known offsets as shown at 437 in FIG. 5A.

If at 450, it is determined that the source and destination port numbers do not match an entry in the Well Known Port Table, then this IP Packet is linked to the "Other IP" application at 450 and the quadruple for the IP packet is added into the IP Flow Table along linked to the "Other IP" application. Again, when a packet is assigned to "Other IP", this means that the packet is associated with an unrecognized application.

Next, at 465, the IP packet is inspected to determine if there is a declaration of port hopping. If the packet identifies a port hop then at 470 the IP Flow Table is updated and the quadruple entry in the IP Flow Table for that IP Flow is changed to show the new port while keeping the same associated application. At 475, it is determined whether the application for this IP packet has an associated packet inspection technique. If so, then at 480, the packet inspection technique is executed to determine whether the IP Flow is a child or sub-application to a higher level application. If the packet inspection reveals that the IP Packet belongs to a child application, then at 485 the packet is linked with the child application and at 490 the IP Flow Table is updated to list the child application for that IP Flow.

The knowledge of network activity in terms of Application Flows, also referred to herein as application network usage, can be used in network management systems in several ways.

In terms of troubleshooting problems on the network, application network usage quickly highlights undesirable applications that are misusing network bandwidth, and unexpected application usage that is interfering with the performance of more business critical applications. Application network usage allows for comparison against historical trends to enable identification of network bottlenecks that result from significant changes in application activity.

Figure 6:
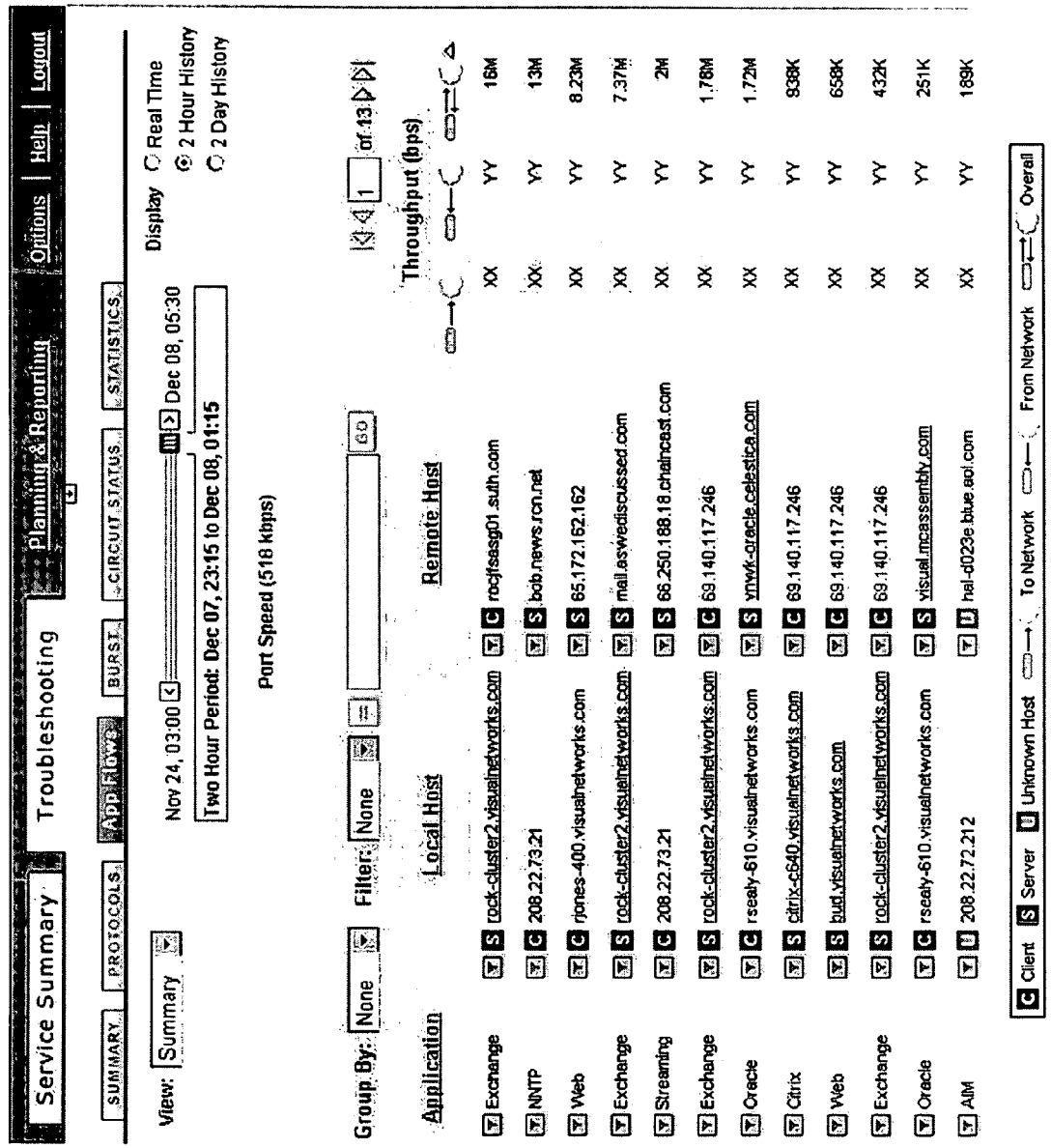
FIGS. 6-11 are exemplary screen shots displaying data pertaining to applications determined to be occurring on the network according to an embodiment of the invention.
Figure 7:
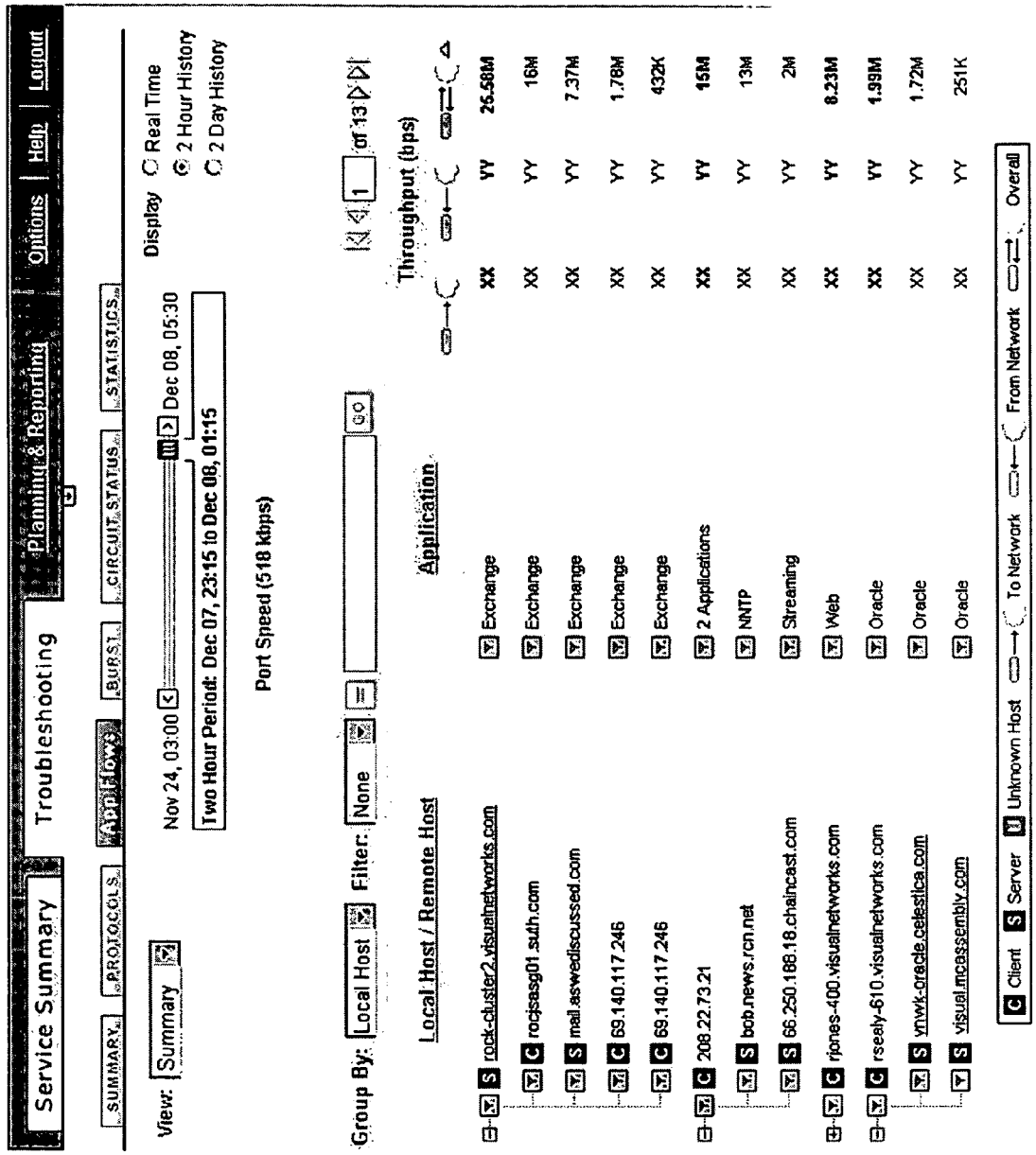
Figure 8:
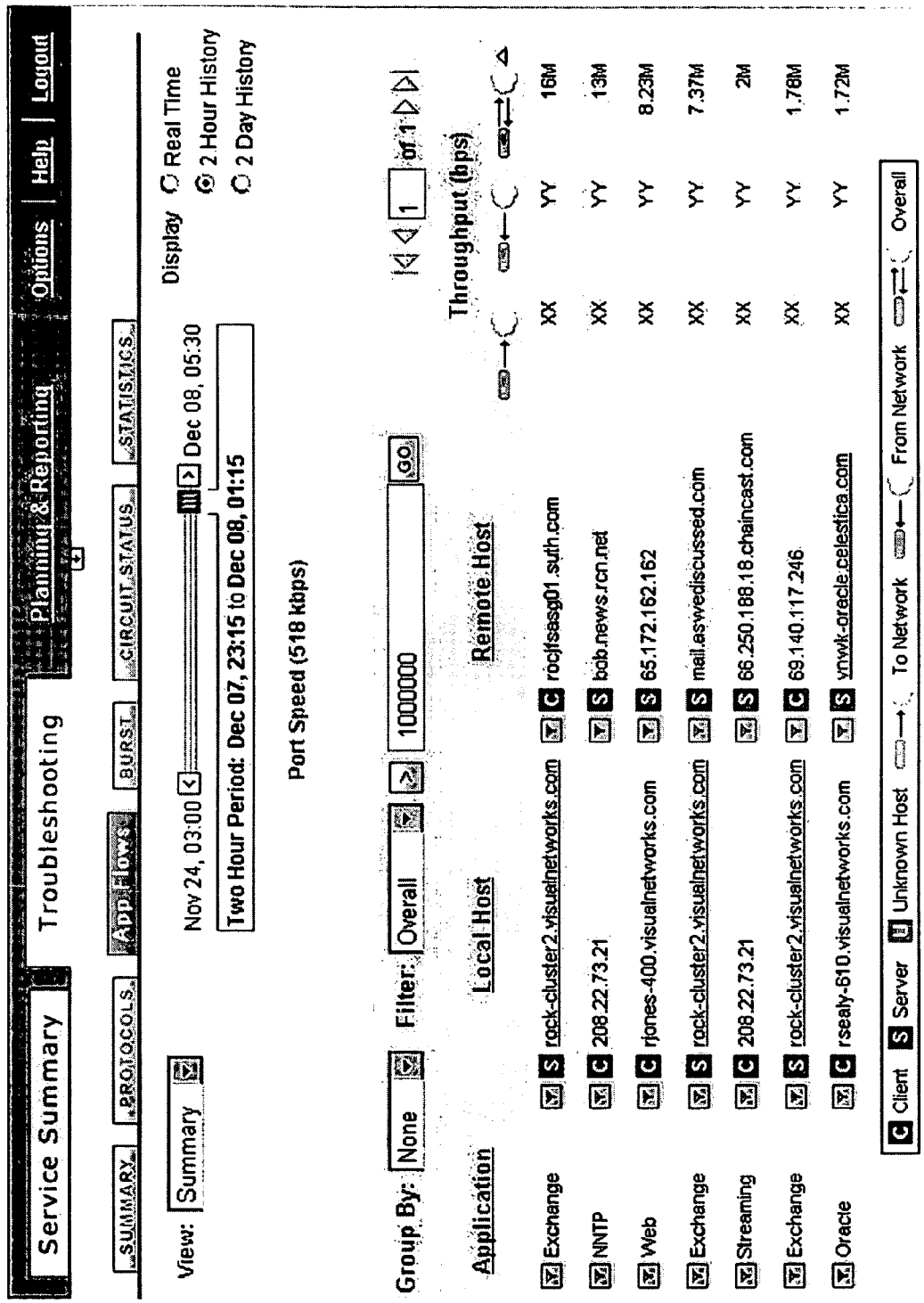
Figure 9:
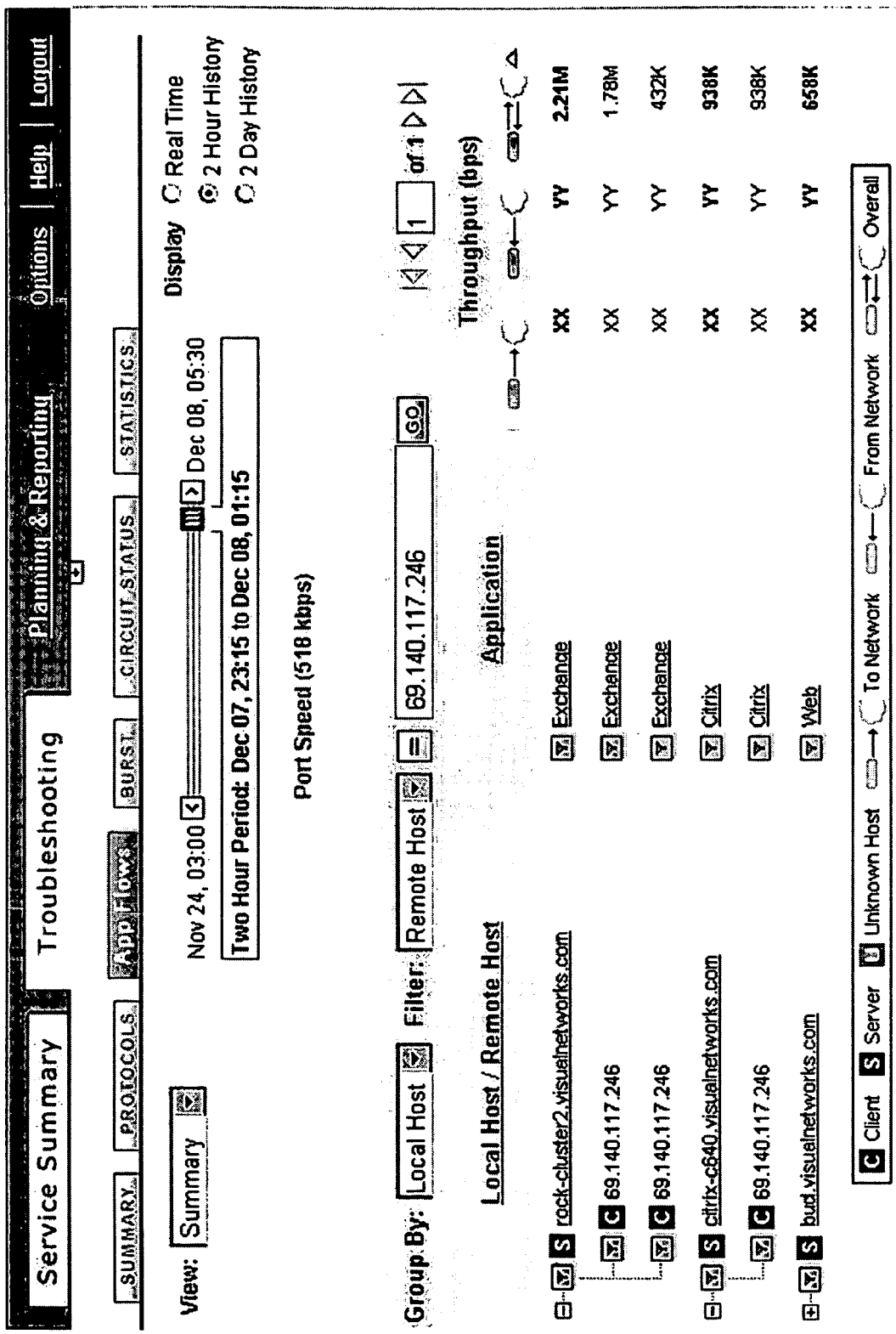
Figure 10:
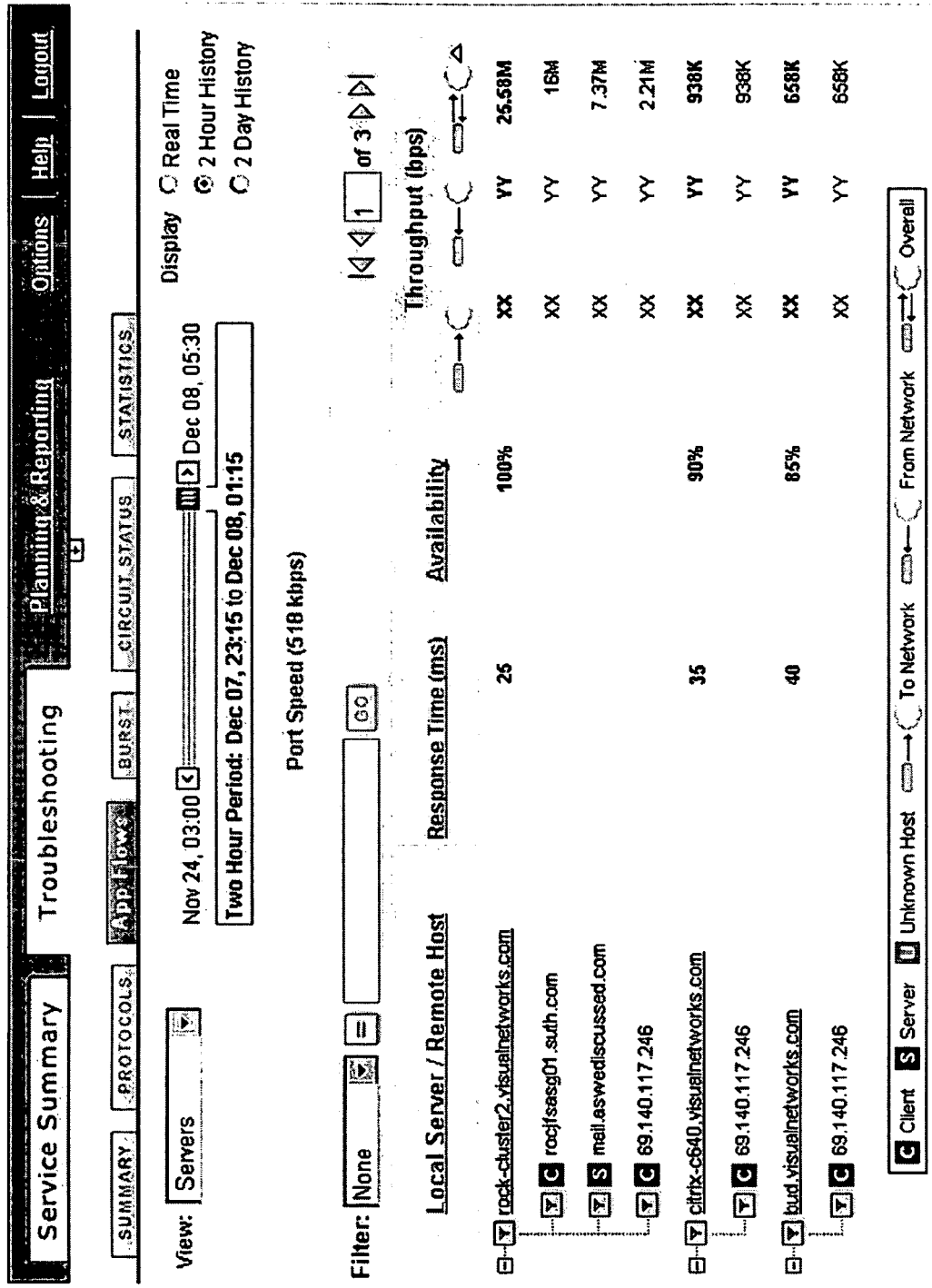
Figure 11:
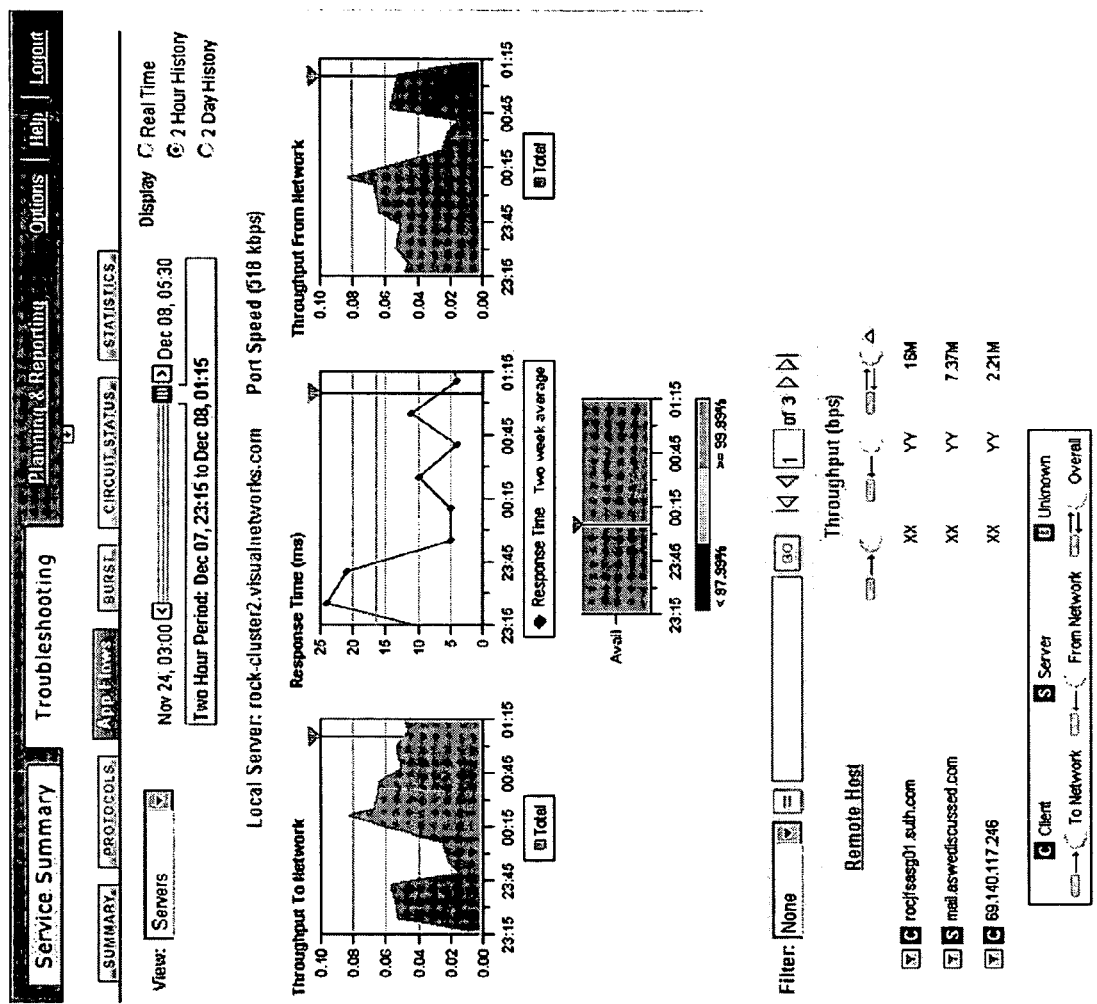

FIGS. 6-9 are exemplary screen shots of a graphic user interface (GUI) for displaying results of the Application Flows analysis described herein. The data pertaining to the applications determined to be occurring in the network may be presented in a variety of ways, some of which are shown in these figures. A list of applications determined to be occurring may be grouped by local host/remote lost, host server/remote host, application type, etc. In addition, a view may be presented whereby only applications that meet a certain "filtering" criteria (a particular host device, or having a certain minimum throughput) are shown. FIG. 6 shows a summary type view listing the applications determined to be using the network, and for each application the local host and remote host associated with the application is identified. In addition, there are columns for indicating the throughput in each direction and bi-directionally, for each application. FIG. 7 shows a summary type view that lists the applications grouped by local host (and each of the associated remote hosts). FIG. 8 shows an example of a summary type view that lists the application filtered to show only those applications that have an overall throughput greater than 1 Mbps. FIG. 9 shows a summary type view that lists the applications grouped by local host and filtered to show only applications in which a particular remote host is involved. FIG. 10 illustrates a server type view that lists each local server determined to be involved in an Application Flow. In addition, for each local server listed, the response time and percentage available is listed, as well as overall throughput. The server response time provides a meaningful and compelling troubleshooting tool that eliminates the "noise" of IP Flow response times by monitoring the performance of the application. FIG. 11 illustrates a more detailed server view where plots are shown for throughput to and from the network as well as response time for a particular server.

The ability to detect an application on the network and identify the device that acts as a server for an application is important. Once an application is detected, the server's response time and latency with respect to that application can be monitored. Moreover, a single device on the network may act as an application server for multiple different applications at the same time. If the packets flowing in the network were analyzed only at the IP Flow level, it would not be possible to obtain this type of knowledge; only a stream of IP packets would be observed. By abstracting from IP packets to Application Flows, it is possible to see that there are actually several applications served by a particular device on the network. Parameters such as the traffic volume, latency and response time those application flows can be individually monitored to determine whether any one of those applications is not being properly served. For example, the packet traffic volume may be high for that application but the response time is quite low. This indicates a potential problem. On the other hand, that same application on another device in the network is being served well. Detecting and monitoring Application Flows can reveal problems in advance to prevent a major network failure, and/or can be used in retrospect to diagnose what has already occurred in order to fix the failure.

The Application Flow based network monitoring and analysis technique described herein has many benefits. It provides the capability to identify all applications running on every port of a network environment, and provides information about each individual application flow, client-to-server, server-to-server or peer-to-peer. It is possible to quickly isolate whether a user is authorized and whether the application is business-critical, recreational or unknown/rogue. With this information, it can be determined whether additional resources should be allocated, or whether a particular user or application should be "shut off" so that resources are used appropriately.

In the past, most enterprises had business-critical applications and servers hosted at headquarters or a single data center. More recently, enterprises are deploying applications like Voice over IP (VoIP) and Web Services that require a distributed architecture, meaning these applications are sourced at many locations throughout the network. Instead of supporting a single host location, application and IT managers are now forced to manage many disparate locations. The methods and apparatus described herein provide the critical visibility needed to properly monitor, manage and troubleshoot individual performance issues across every location in your infrastructure without having to dispatch technicians or equipment to remote sites.

When managing application delivery across the infrastructure, unknown problems or intermittent issues can grow from a minor nuisance to a full-blown outage. The techniques described herein allow for identification of abnormalities, monitoring of individual application flows and measuring utilization across all applications on the network infrastructure. For example, a virus or denial of service attack might invade a network infrastructure and flood the network with useless or damaging traffic. Instead of guessing which end users or servers are impacted, resolution time can be expedited by quickly identifying and troubleshooting only the infected resources.

Business-critical servers connected to the network infrastructure can be quickly identified and drilled down to monitor individual server performance. By tracking usage, connect and response time and top remote hosts by server, performance degradation between the server and the network can be isolated, and minimizing "finger-pointing" between application and network organizations.

Some enterprises have a handful of business-critical applications that are paramount to the success of the organization. Using the techniques described herein, detailed views are provided to ensure these applications are performing properly. Or more importantly, when these applications are degraded, visibility is provided to isolate the cause between an issue exclusively with that application or if another application is impacting the more critical application. For example, a large burst of FTP traffic could severely impact VoIP call quality.

Application related performance metrics can trigger alerts to complimentary systems (e.g., "Trouble Ticketing") to inform administrators of new applications on the network (e.g. rogue applications). Alerts can be generated when the network bandwidth requirements of legitimate applications climbs significantly and when known application servers experience performance problems. Application related performance metrics for key business applications provides the foundation for trending, service level agreements and planning.

Thus, the present invention provides a technique for collecting application information at one or more network monitoring points, wherein the application information includes the type of application, the source destination addresses, the amount of data transferred, and whether or not the data came from a server or a client. This data may be aggregated on a periodic or on-demand basis to produce one or more of: (1) a list of applications (by name) of the applications used and the total volume of traffic that each application represents; (2) a list of application users (local and remote hosts) for each application of traffic each application user represents; (3) a list of application servers, the data volume, and a measure of the connect time and response time experience by users of each server over a recent period of time (e.g., the last day); (4) a list of clients using each application or each application server; and (5) a running average over a time interval (e.g., one or more weeks) of each of these metrics.

Again, this information can provide a network administrator a snapshot (or comparison to an average maintained for a certain period of time) of the total application activity in the network, and provides a useful high level view of the network activity for less technology-savvy persons who are interested in knowing about network performance. Using this information, trends can be spotted, such as increasing traffic volume or application response time. In addition, non-business related applications can be tracked and any new "rogue" servers identified.

Although the preferred embodiment discloses a particular functional representation of the monitoring devices, any data gathering devices capable of capturing and recording performance metrics can be used according to the principles of the present invention.

Having described preferred embodiments of new and improved methods and apparatus for identifying chronic performance problems on data networks, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A method for analyzing traffic on a network, comprising:
at one or more monitoring devices connected to the network, monitoring packets exchanged between devices on the network by extracting from the packets header information comprising one or more of a source address, source port, destination address, and destination port;
at a computing device:

storing information that associates ranges of addresses and ports with applications that may be occurring between two devices on the network;

identifying application flows occurring on the network based on header information of packets, wherein an application flow consists of a collection of packets exchanged between two devices on the network for a single application, wherein identifying comprises comparing one or more elements of the header information of packets with the stored information pertaining to possible applications occurring on the network and assigning a packet to an application flow based on said comparing, wherein identifying further comprises examining the header information of a packet to determine whether it identifies a port hop and modifying the stored information to identify a new port associated with an application flow if a port hop is identified in the packet;

wherein when a port hop is detected in a collection of packets associated with an application flow previously identified from an original collection of packets, said assigning comprises assigning the collection of packets to the same application flow as the original collection of packets prior to the port hop in order to track the collection of packets after the port hop and the original collection of packets as one application flow; and analyzing data pertaining to the application flows that are identified to generate statistics from the identified application flows that indicate performance of the network.

2. The method of claim 1, wherein identifying comprises comparing port numbers contained in the header information for the packet with stored information that associates port numbers with a corresponding application.

3. The method of claim 1, and further comprising storing a list of a plurality of applications determined to be occurring on the network based on said identifying.

4. The method of claim 3, wherein identifying comprises assigning a packet to an application already contained in said list when there is a match between one or more of the elements of the header information of the packet with similar such information for an application in said list, and adding a new application to said list when there is not a match between one or more elements of the header information of the packet with similar such information of an application already in said list.

5. The method of claim 1, wherein identifying comprises assigning further packets to a particular application contained in said list when it is determined that said further packets are associated with said particular application even though their header information indicates a different port or address.

6. The method of claim 1, wherein identifying further comprises comparing content of a packet, beyond the header information, when it is determined that one or more elements of the packet fall within ranges of addresses and ports for a specific application in said stored information to determine whether the said specific application is occurring on the network.

7. The method of claim 1, and further comprising storing data describing a hierarchy of applications, the hierarchy comprising at least one top node associated with an application and a plurality of intermediate nodes associated with corresponding sub-applications that are functionally related to the application of the top node, and wherein the data describing the hierarchy comprises data describing standard port numbers and any dynamically assigned port numbers for each of the plurality of applications and sub-applications in said hierarchy.

8. The method of claim 7, wherein identifying comprises examining content of a packet, beyond the header information, to determine whether the packet is associated with a sub-application with respect to an application in said hierarchy.

9. The method of claim 1, wherein said analyzing comprises analyzing performance of the network based on accumulated data pertaining to applications that are determined to be occurring on the network.

10. The method of claim 9, wherein said analyzing comprises generating a list of applications determined to be occurring over time on the network, wherein said list associates applications with local and remote host devices transmitting the packets associated with the application flow.

11. The method of claim 9, wherein said analyzing comprises determining the throughput associated with each of the applications.

12. The method of claim 9, wherein said analyzing further comprises determining one or more of the traffic volume, latency and response time of devices acting as application servers on the network.

13. The method of claim 9, wherein said analyzing comprises categorizing the applications into classes including legitimate business applications and non-business legitimate applications.

14. The method of claim 9, and further comprising displaying a list of applications determined to be occurring on the network based on said application flows.

15. The method of claim 14, wherein said displaying further comprises displaying said list of applications grouped by host device.

16. The method of claim 14, wherein said displaying comprises displaying only those applications associated with a particular host device.

17. The method of claim 14, wherein said displaying comprises displaying said list of applications grouped by server device.

18. A tangible computer readable memory medium storing instructions, that when executed by a computer, cause the computer to perform functions of:

monitoring packets on a network exchanged between devices on the network by extracting from the packets header information comprising one or more of a source address, source port, destination address, and destination port;

storing information that associates ranges of addresses and ports with applications that may be occurring between two devices on the network;

identifying application flows occurring on the network based on header information of packets, wherein an application flow consists of a collection of packets exchanged between two devices on the network for a single application, wherein identifying comprises comparing one or more elements of the header information of packets with the stored information pertaining to possible applications occurring on the network and assigning a packet to an application flow based on the comparison, wherein the instructions for identifying comprise instructions for examining the header information of a packet to determine whether it identifies a port hop and to modify the stored information to identify a new port associated with an application flow if a port hop is identified in the packet;

when a port hop is detected in a collection of packets associated with an application flow previously identified from an original collection of packets, assigning the collection of packets to the same application flow as the original collection of packets prior to the port hop in order track the collection of packets after the port hop and the original collection of packets as one application flow; and analyzing data pertaining to the application flows that are identified to generate statistics from the identified application flows that indicate performance of the network.

19. The computer readable memory medium of claim 18, wherein said instructions for identifying comprise instructions for comparing port numbers contained in the header information for the packet with stored information that associates port numbers with a corresponding application.

20. The computer readable memory medium of claim 18, and further comprising instructions, that when executed, cause the computer to store a list of a plurality of applications determined to be occurring on the network based on said identifying.

21. The computer readable memory medium of claim 20, wherein the instructions for identifying comprise instructions for assigning a packet to an application already contained in said list when there is a match between one or more of the elements of the header information of the packet with similar such information for an application in said list, and further comprising instructions, that when executed by the computer, add a new application to said list when there is not a match between one or more elements of the header information of the packet with similar such information of an application already in said list.

22. The computer readable memory medium of claim 18, wherein the instructions for identifying comprise instructions for comparing one or more elements of the header information of the packet with stored information that associates ranges of addresses and ports with specific applications.

23. The computer readable memory medium of claim 18, wherein the instructions for identifying further comprise instructions for examining content of a packet, beyond the header information, to determine whether said specific application is occurring on the network.

24. The computer readable memory medium of claim 18, and further comprising instructions that, when executed by the computer, cause the computer to store data describing a hierarchy of applications, the hierarchy comprising at least one top node associated with an application and a plurality of intermediate nodes associated with corresponding sub-applications that are functionally related to the application of the top node, and wherein the data describing the hierarchy comprises data describing standard port numbers and any dynamically assigned port numbers for each of the plurality of applications and sub-applications in said hierarchy.

25. The computer readable memory medium of claim 18, wherein the instructions for analyzing comprise instructions for analyzing performance of the network based on accumulated data pertaining to applications that are determined to be occurring on the network.

26. The computer readable memory medium of claim 25, wherein the instructions for analyzing comprise instructions for generating a list of applications determined to be occurring over time on the network, wherein said list associates applications with local and remote host devices transmitting the packets associated with the application flow.

27. The computer readable memory medium of claim 26, wherein the instructions for analyzing comprise instructions for determining the throughput associated with each of the applications.

28. The computer readable memory medium of claim 27, wherein the instructions for said displaying comprise instructions for displaying said list of applications grouped by host device.

29. The computer readable memory medium of claim 27, wherein the instructions for displaying comprise instructions for displaying only those applications associated with a particular host device.

30. A system for monitoring a network, comprising:
at least one network monitoring device connected in the network so as to monitor packets exchanged between devices on the network by extracting from the packets header information comprising one or more of a source address, source port, destination address, and destination port; and
a computer coupled to said at least one network monitoring device that identifies applications occurring between devices on the network based on information derived from said at least one network monitoring device, wherein the computer is configured to:
store information that associates ranges of addresses and ports with applications that may be occurring between two devices on the network;
identify application flows occurring on the network based on header information of packets, wherein an application flow consists of a collection of packets exchanged between two devices on the network for a single application, by comparing one or more elements of the header information of packets with the stored information pertaining to possible applications occurring on the network and assigning a packet to an application flow based on the comparison, and to examine the header information of a packet to determine whether it identifies a port hop in order to modify the stored information to identify a new port associated with an application flow if a port hop is identified in the packet;
when a port hop is detected in a collection of packets associated with an application flow previously identified from an original collection of packets, assign the collection of packets to the same application flow as the original collection of packets prior to the port hop in order track the collection of packets after the port hop and the original collection of packets as one application flow; and
analyze data pertaining to the application flows that are identified to generate statistics from the identified application flows that indicate performance of the network.

31. The system of claim 30, wherein said computer is configured to compare port numbers contained in the header information for the packet with stored information that associates port numbers with a corresponding application.

32. The system of claim 30, wherein said computer is configured to store a list of a plurality of applications determined to be occurring on the network.

33. The system of claim 32, wherein the computer is configured to assign a packet to an application already contained in said list when there is a match between one or more of the elements of the header information of the packet with similar such information for an application in said list, and adds a new application to said list when there is not a match between one or more elements of the header information of the packet with similar such information of an application already in said list.

34. The system of claim 30, wherein said computer compares one or more elements of the header information of the packet with stored information that associates ranges of addresses and ports with specific applications.

35. The system of claim 30, wherein said computer compares content of a packet, beyond the header information, to determine whether a specific application is occurring on the network.

36. The system of claim 30, wherein the computer is configured to assign further packets to a particular application contained in said list when it is determined that said further packets are associated with said particular application even though their header information indicates a different port or address.

37. The system of claim 30, wherein the computer is configured to analyze performance of the network based on accumulated data pertaining to applications that are determined to be occurring on the network.

38. The system of claim 37, wherein the computer is configured to generate a list of applications determined to be occurring over time on the network, wherein said list associates applications with local and remote host devices transmitting the packets associated with the application flow.

39. The system of claim 37, wherein the computer is configured to determine throughput associated with each of the applications and one or more of traffic volume, latency and response time of devices acting as application servers on the network.

40. The system of claim 30, wherein the computer is further configured to store data describing a hierarchy of applications, the hierarchy comprising at least one top node associated with an application and a plurality of intermediate nodes associated with corresponding sub-applications that are functionally related to the application of the top node, and wherein the data describing the hierarchy comprises data describing standard port numbers and any dynamically assigned port numbers for each of the plurality of applications and sub-applications in said hierarchy.

* * * * *